United States Patent
Powers et al.

(10) Patent No.: US 10,483,712 B2
(45) Date of Patent: Nov. 19, 2019

(54) METHOD FOR ENERGY DITHER OF A PARTICLE BEAM

(71) Applicant: JEFFERSON SCIENCE ASSOCIATES, LLC, Newport News, VA (US)

(72) Inventors: Thomas Joseph Powers, Poquoson, VA (US); David R. Douglas, Yorktown, VA (US); Pavel Evtushenko, Yorktown, VA (US); Stephen V. Benson, Yorktown, VA (US); George Neil, Williamsburg, VA (US)

(73) Assignee: JEFFERSON SCIENCE ASSOCIATES, LLC, Newport News, VA (US)

(*) Notice: Subject to any disclaimer, the term of this patent is extended or adjusted under 35 U.S.C. 154(b) by 0 days.

(21) Appl. No.: 16/292,474

(22) Filed: Mar. 5, 2019

(65) Prior Publication Data
US 2019/0207359 A1   Jul. 4, 2019

Related U.S. Application Data

(62) Division of application No. 14/719,380, filed on May 22, 2015, now Pat. No. 10,367,326.

(60) Provisional application No. 62/001,656, filed on May 22, 2014.

(51) Int. Cl.
*H01S 3/09* (2006.01)
*H01S 3/0959* (2006.01)
*H01S 3/102* (2006.01)

(52) U.S. Cl.
CPC .......... *H01S 3/0903* (2013.01); *H01S 3/0959* (2013.01); *H01S 3/102* (2013.01)

(58) Field of Classification Search
CPC ....... H01S 3/0903; H01S 3/0959; H01S 3/102
See application file for complete search history.

(56) References Cited

U.S. PATENT DOCUMENTS 4,809,281 A * 2/1989 Neil ............ H01S 3/0903
                                                           372/2

OTHER PUBLICATIONS

"Stars—a two-stage high-gain harmonic generation FEL demonstrator" Abo-Bakr et al. 2007 (Year: 2007).*
"Design work of the erl-fel as the high intense euv light source" Nakamura et. al. 2015 (Year: 2015).*

* cited by examiner

*Primary Examiner* — M. A. Golub-Miller

(57) ABSTRACT

A method for varying the wavelength of a free electron laser (FEL) by applying an energy dither to the charged particles supplying the FEL. Bunches of charged particle beams are accelerated by cavities that are operated at a harmonic of the bunch repetition rate. The method involves adding one or more secondary radiofrequency accelerator cavities after the primary beam transport and near the wiggler to apply a fluctuation between individual bunches with a pseudo-random distribution. The secondary radiofrequency accelerator cavities provide fine variations of the beam energy about a nominal operating point. Operating a free electron laser (FEL) with a 1% change in the electron beam energy via the added secondary cavities will result in a 2% wavelength variation of the FEL output.

2 Claims, 2 Drawing Sheets

METHOD FOR ENERGY DITHER OF A PARTICLE BEAM

This application is a divisional application of U.S. patent application Ser. No. 14/719,380 filed on May 22, 2015 and claims the benefit of Provisional U.S. Patent Application Ser. No. 62/001,656 filed May 22, 2014.

The United States Government may have certain rights to this invention under Management and Operating Contract No. DE-AC05-06OR23177 from the Department of Energy.

FIELD OF THE INVENTION

The present invention relates to charged particle beams and more particularly to a method for applying an energy dither to a charged particle beam in order to vary the wavelength of the laser light produced by the charged particle beam.

BACKGROUND OF THE INVENTION

The output wavelength of a Free Electron Laser (FEL) is determined by the electron beam energy and the wiggler or undulator parameters of wavelength and field strength. It may be desirable in certain applications to vary the wavelength of the FEL output. Although this could in principle be done by changing the wiggler parameters, such variation would occur too slowly for many applications.

Although the electron beam energy out of the accelerator can be changed by the primary acceleration system, the physics of the electron beam transport from the accelerator to the wiggler may be affected in an undesirable manner which degrades or prevents the lasing process.

Accordingly, it would be desirable to provide a method for varying the wavelength of the output of an FEL in a manner that does not degrade or prevent the lasing process.

OBJECT OF THE INVENTION

It is therefore an object of the present invention to provide a method for applying an energy dither to a charged particle beam in order to vary the wavelength of the laser light produced by the charged particle beam.

A further object of the invention is to provide a fluctuation between individual bunches of charged particles with a pseudo-random distribution.

A further object is to provide a distribution of laser wavelengths in a free electron laser.

A further object is to provide a means of varying the energy in a free electron laser in order to vary the output wavelength of the FEL by a determined amount.

Another object of the invention is to provide a method for achieving fine variations of the beam energy of a charge particle beam by adding one or more separate radiofrequency accelerator cavities near the wiggler after the primary beam transport.

A further object of the invention is to provide a method for varying the energy output of a free electron laser to produce a small number of unique values that are reproducible in time by adding one or more accelerating cavities in which the frequency of the cavities are set at a harmonic or sub-harmonic of the primary accelerator bunch frequency.

A further object of the invention is to provide one or more accelerating cavities to a free electron laser near the wiggler after the primary beam transport and to operate the cavities at a non-integer harmonic or sub-harmonic of the primary accelerator bunch frequency in order to vary the output in a pseudo-random manner over a range set by the cavity accelerating gradients and frequencies.

SUMMARY OF THE INVENTION

The invention is a method for applying an energy dither to a charged particle beam in order to vary the wavelength of the charged particle beam. Bunches of charged particles are accelerated by cavities that are operated at a harmonic of the bunch repetition rate. One or more secondary radiofrequency accelerator cavities are added near the wiggler after the primary beam transport to apply a fluctuation between individual bunches with a pseudo-random distribution. The secondary radiofrequency accelerator cavities provide fine variations of the beam energy about a nominal operating point. Operating a free electron laser (FEL) with a 1% change in the electron beam energy via the secondary cavity will result in a 2% wavelength variation of the FEL output.

DETAILED DESCRIPTION

The current invention includes a method for applying an energy dither to a charged particle beam in order to provide fine variations of the beam energy about a nominal operating point.

According to the method of the present invention, one or more secondary radiofrequency accelerator cavities are added near the wiggler after the primary beam transport. The secondary radiofrequency accelerator cavities are used for fine variations of the beam energy about a nominal operating point.

Figure 2:
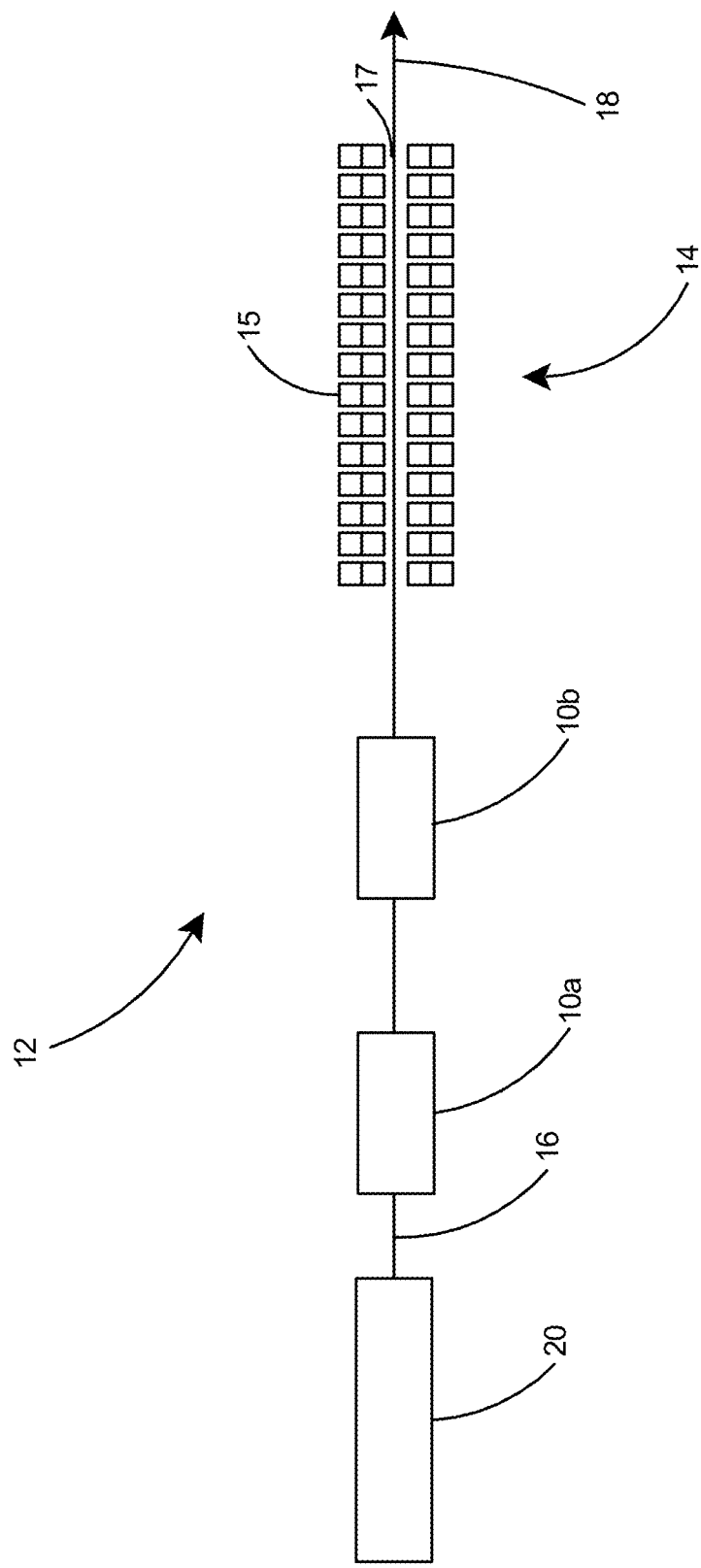
FIG. 2 is a schematic depicting the layout of a free electron laser illustrating the principles of the present invention.

In a practical application, with reference to FIG. 2, depicting a free electron laser 12 supplied with charged particles from a primary accelerator 20, one or more secondary radiofrequency accelerator cavities 10a and 10b are added to a free electron laser (FEL) 12 near the wiggler 14 after the primary beam transport 16. The wiggler 14 includes a group of magnets 15 with alternating poles longitudinally arranged along a narrow gap. The frequency of the secondary accelerating cavity may be chosen as a harmonic or sub-harmonic of the primary accelerator bunch frequency, in which case the variation in energy output will be a small number of values reproducible in time. If a more random variation is desired, the cavity frequency or frequencies can be chosen as non-integer harmonic, harmonics or sub-harmonics of the bunch frequency and the output will vary in a pseudo-random manner over a range set by the cavity accelerating gradients and frequencies. A wide range of energy distributions can be obtained depending on these parameters. An approximate 1% change in the electron beam energy via the secondary cavity 10 will result in a 2% wavelength variation of the FEL output 18.

Figure 1:
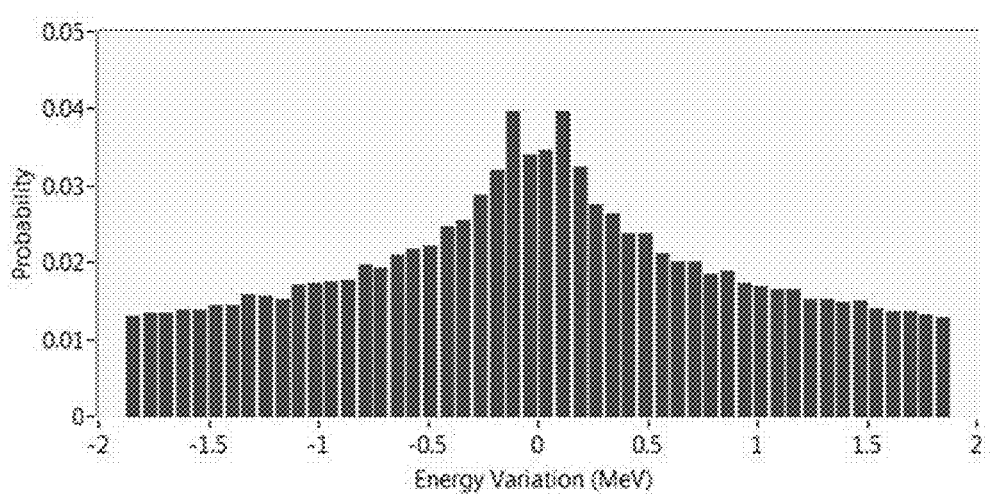
FIG. 1 is a plot of the energy distribution of a particle beam subject to an applied energy dither according to the present invention.

As an example, if one were to use 320 MHz for the bunch frequency, a secondary cavity 10a operating at 833.23 MHz with an accelerating voltage of 0.88 MeV, a secondary cavity 10b operating at 823.0 MHz with an accelerating voltage of 1.0 MeV, and sample the resultant beam variation over a 1 ms period; one would obtain 7745 energies with the distribution functions shown in FIG. 1.

The method of the present invention, using cavities with frequencies that are non-integer harmonics of the bunch repetition rates, allows one to vary the wavelength of the FEL output beam by changing the energy of the input particle beam, which is valuable in industrial applications of FELs and other charged particle beams. The method described herein is applicable to any charged particle beam, including electron beams and proton beams, and is also applicable to any architecture for producing the beam including free electron lasers, synchrotrons, cyclotrons, and linear accelerators. The meaning of various terms used herein are as follows:

1) The term "primary accelerator bunch frequency" as used herein refers to the primary frequency applied to group electrons such that they occupy a small longitudinal space relative to the wavelength of the accelerating RF frequency. The CEBAF bunch length is about 0.5 mm. The number of electrons per bunch can be calculated from the beam current, the electron charge ($1.60217733 \times 10^{-19}$ C), and the bunch frequency (nominally 1497 MHz).

2) The term "wiggler" refers to a group of magnets with alternating poles longitudinally arranged along a narrow gap in order to bend a particle beam in a sinusoidal path to generate synchrotron light.

3) The term "radiofrequency accelerator cavity" refers to a closed volume structure, e.g. cube, cylinder, sphere, ellipsoid, that resonates at frequencies whose wavelengths are half integer multiples of the dimensions. At the right frequency, a resonant field can build up to store thousands (copper cavity) or millions (superconducting cavity) of times more energy than when off resonance. This is the fundamental foundation for accelerating structures that can develop gradients equivalent to millions of volts.

4) The term "primary beam transport" as used herein refers to the system used to control the particle beam path and the energy properties of the beam in order to transport the beam to the wiggler.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments herein were chosen and described in order to best explain the principles of the invention and the practical application, and to enable others of ordinary skill in the art to understand the invention for various embodiments with various modifications as are suited to the particular use contemplated.

What is claimed is:

1. A method for varying the output wavelength of a free electron laser by changing the energy of the input particle beam, comprising:
   a. providing an accelerator producing a charged particle beam including bunches of charged particles having a primary bunch repetition frequency at a primary accelerator cavity frequency or a subharmonic thereof;
   b. providing a wiggler to periodically laterally deflect the charged particle beam;
   c. adding one or more secondary radiofrequency accelerator cavities after the accelerator and before the wiggler;
   d. setting the frequency of each added secondary radiofrequency accelerating cavities to a non-integer harmonic or subharmonic of the primary bunch repetition frequency; and
   e. adjusting the accelerating voltage of each of the secondary cavities to provide a desired variation in the energy of the bunches which make up the charged particle beam, whereby the variation in the output wavelength of the free electron laser includes a distribution equal to a multiple of the energy distribution of the charged input particle beam.

2. In a free electron laser (FEL) system including an input particle beam, a method for varying the output wavelength of the FEL output beam by changing the energy of the FEL input particle beam, comprising:
   a. providing a primary accelerator cavity for supplying the input particle beam and a primary beam transport for transporting the input particle beam, wherein the input particle beam has energy with a nominal operating point and a primary accelerator bunch frequency;
   b. providing a wiggler to periodically deflect the beam of particles inside the input particle beam;
   c. inserting one or more secondary radiofrequency accelerator cavities between the primary beam transport and the wiggler;
   d. setting the frequency of each secondary radiofrequency accelerator cavity to a non-integer harmonic or subharmonic of the primary accelerator bunch frequency; and
   e. dithering the particle beam energy of the FEL input particle beam by operating the secondary radiofrequency accelerator cavities at the non-integer harmonic or subharmonic of the primary accelerator bunch frequency, said dithering varying the particle beam energy of the FEL input particle beam about the nominal operating point and varying the wavelength of the FEL output beam.

* * * * *